United States Patent [19]

Glass et al.

[11] 4,374,858

[45] Feb. 22, 1983

[54] ASPARTAME SWEETENED CHEWING GUM OF IMPROVED SWEETNESS STABILITY

[75] Inventors: Michael Glass, Flushing; Theresa Cea, Brooklyn, both of N.Y.

[73] Assignee: Warner-Lambert Company, Morris Plains, N.J.

[21] Appl. No.: 239,937

[22] Filed: Mar. 3, 1981

Related U.S. Application Data

[63] Continuation-in-part of Ser. No. 81,995, Oct. 4, 1979, abandoned.

[51] Int. Cl.$^3$ .......................... A23G 3/30; A23L 1/22
[52] U.S. Cl. ......................................... 426/5; 426/548
[58] Field of Search ......................................... 426/3-6, 426/548

[56] References Cited

U.S. PATENT DOCUMENTS

| | | | |
|---|---|---|---|
| 1,267,320 | 5/1918 | Fries | 426/5 |
| 3,943,258 | 3/1976 | Bahoshy et al. | 426/3 |
| 3,982,023 | 9/1976 | Bahoshy et al. | 426/3 |
| 4,036,992 | 7/1977 | Bahoshy et al. | 426/3 |
| 4,127,677 | 11/1978 | Fronczkowski et al. | 426/5 |
| 4,238,510 | 12/1980 | Cherukuri et al. | 426/5 |

*Primary Examiner*—Jeanette M. Hunter
*Attorney, Agent, or Firm*—Gary M. Nath

[57] ABSTRACT

The sweetness stability of an aspartame sweetened chewing gum is enhanced by coating the aspartame onto the surface of the chewing gum piece.

6 Claims, No Drawings

ASPARTAME SWEETENED CHEWING GUM OF IMPROVED SWEETNESS STABILITY

CROSS REFERENCE TO RELATED APPLICATION

This application is a continuation-in-part of our copending application Ser. No. 081,995, filed Oct. 4, 1979 now abandoned.

BACKGROUND OF THE INVENTION

Aspartame, L-aspartyl-L-phenylalanine methyl ester, is a known artificial sweetener, U.S. Pat. No. 3,492,131. Its use in chewing gum formulations is restricted, however, due to its instability when present in such formulations. Thus, aspartame containing chewing gum formulations are known to lose their sweetness with the passage of time (U.S. Pat. Nos. 4,122,195 and 4,139,639); thereby severely limiting the shelf life of an aspartame sweetened chewing gum. U.S. Pat. Nos. 4,122,195 and 4,139,639 attempt to solve this inherent instability problem by fixing aspartame in various encapsulating compositions prior to its incorporation in a chewing gum formulation.

The present invention solves the instability problem by coating aspartame onto the surface of the chewing gum piece. The advantages of the present invention over the tedious methods taught by the prior art will be apparent to those skilled in the art.

SUMMARY OF THE INVENTION

The invention sought to be patented in its method aspect is a method for improving the sweetness stability of an aspartame sweetened chewing gum, which comprises coating the aspartame onto the surface of the chewing gum piece.

The invention sought to be patented in a composition aspect is an aspartame sweetened chewing gum having improved sweetness stability which comprises a chewing gum piece having aspartame coated onto its surface.

The invention sought to be patented in a product by process aspect is an aspartame sweetened chewing gum composition having improved sweetness stability which is prepared by coating aspartame onto the surface of the chewing gum piece.

DESCRIPTION OF THE PREFERRED EMBODIMENTS

The present invention may be practiced using standard techniques and standard processing equipment all of which will be familiar to those skilled in the art.

Chewing gum is rolled and extruded prior to being formed into individual pieces as a basic step in manufacture. It has been known to dust or surface coat with various materials during these processing steps in order to lubricate the chewing gum as it passes through the rollers and extruders. Thus, for example, calcium carbonate has been utilized for this purpose. It has now been found that the sweetness stability of an aspartame sweetened chewing gum can be prolonged by coating the aspartame onto the surface of the chewing gum instead of incorporating it in the chewing gum mix. The aspartame may be dusted/surface coated onto the surface of the chewing gum at any time during processing so long as the aspartame does not become incorporated into the chewing gum mix. The surface coating is preferably applied during the rolling and/or extruding operations. In the most preferred method, the aspartame is applied as a surface coating after extrusion. Additional aspartame may be applied thereafter during subsequent processing steps such as during roll forming steps and wrapping. The total amount of aspartame which is applied as the surface coating is that amount which, in combination with other sweeteners present, produces an acceptably sweet chewing gum.

The surface coating of aspartame also serves to lubricate the chewing gum as it passes through the rollers and extruders.

The aspartame may be applied to the surface of the chewing gum in pure powdered form, in encapsulated form or combinations thereof. The aspartame may also be diluted with other known surface coating or dusting agents such as calcium carbonate, talc, mannitol, sugar, starch, sorbitol and the like and surface coated onto the chewing gum as a mixture. Further, the aspartame may be surface coated in pure, encapsulated or diluted form either before or after dusting the chewing gum with other surface coating agents.

Generally, up to about 0.25% by weight of aspartame is surface coated/dusted onto the surface of the chewing gum product; preferably up to about 0.18% by weight of aspartame, and most preferably up to about 0.058% by weight of aspartame. All weight percentages are based on the weight of the finished chewing gum composition unless otherwise noted.

In addition to the aspartame surface coating, the chewing gum will also comprise additional sweeteners; some of which may also serve as bulking agents. These additional sweeteners will normally be incorporated into the chewing gum, but they may also be present, for example, in the aspartame containing surface coating or in the liquid portion of a center filled chewing gum. The present invention contemplates all such uses and combinations of such uses for the additional sweeteners.

The additional sweeteners may be natural or artificial, caloric or non-caloric and may be additional aspartame itself which may further be encapsulated or be in processed or unprocessed form. The amount of aspartame present in the surface coating can be adjusted depending on the location, quantity and variety of the additional sweeteners that are present. The optimization of the amounts of all sweeteners that are present, in order to produce an acceptably sweetened chewing gum composition, is within the skill of the art.

The additional, sweeteners contemplated by the invention will be familiar to those skilled in the art and are exemplified by the following non-limiting list: sugars such as sucrose, glucose (corn syrup), dextrose, invert sugar, fructose and mixtures thereof; saccharine and its various salts such as the sodium or calcium salt; cyclamic acid and its various salts such as the sodium salt; the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also contemplated as an additional sweetener is the non-fermentable sugar substitute (hydrogenated starch hydrolysate) which is described in U.S. Pat. No. Re. 26,959. Also contemplated is the synthetic sweetener 3,4-dihydro-6-methyl-1,2,3-oxathiazin-4-one-2,2-dioxide particularly the potassium, sodium and calcium salts thereof as described in German Pat. No. 2,001,017.7. Any sweetener normally utilized in chewing gum compositions as well as mixtures thereof may be present in addition to the aspartame which is present in the surface coating. Those skilled in the art will appreciate that when aspartame is optionally present, for example, in the chewing gum or in the liquid portion of a center filled chewing gum some degradation of this portion of the aspartame will be experienced with the passage of time.

The chewing gum compositions contemplated by the invention comprise all types of chewing gums and chewing gum formulations known to those skilled in the art. For example, stick, slab and chunk sizes; sugarless, sugar sweetened and mixtures thereof; regular consistency, soft chew consistency, non-stick and bubble gum; and sugar and sugarless center filled gums are all contemplated by the invention.

The chewing gum base contemplated by the invention may be any chewable, substantially water insoluble base such as chicle and substitutes thereof, guttagkay, sorva, jelutong, synthetic polymers such as polyvinyl acetate, synthetic resins, rubbers, and the like and mixtures of these materials. The amount of gum base employed may vary widely depending on the type base used and other ingredients making up the final gum product and other like factors. Generally, however, it has been found that anywhere from 15 to 40% by weight of the final gum composition may be used and preferably from about 20 to about 30%. Plasticizers or softeners such as propylene glycol, glycerine, lecithin, vegetable oils and the like and mixtures thereof may optionally be incorporated within the gum base to achieve a desired texture and consistency. Generally, the flavors employed in chewing gums may be the essential oils or synthetic flavors or mixtures of these. Flavors such as cinnamon, bubble gum, wintergreen, spearmint, peppermint, birch, anise, fruit flavors, and the like may be used satisfactorily with the variety of gum bases. The amount of flavoring material is normally a matter of preference, but may be subject to the consideration of such factors as type of flavor used and the type of base used and the like. Generally, flavoring materials account for about 1% by weight of the total gum composition. Various coloring agents may also be utilized.

The following example illustrates the preparation of an aspartame sweetened chewing gum composition of the invention.

EXAMPLE

| INGREDIENT | APPROXIMATE WEIGHT PERCENT |
|---|---|
| chewing gum base | 20–30 |
| glycerin | 0.3–5.0 |
| sorbitol/70% solids sorbitol solution | 68–80 |
| spearmint flavoring | 0.8–2.0 |
| aspartame | 0.029–0.25 |
| ca. | 100.00 |

The desired amounts of all of the above ingredients, except for the aspartame, are blended to form a uniform mass of chewing gum which is then extruded into a sheet. All, of the major portion of the aspartame, is then coated onto the surface of the sheet by a standard procedure. For example, the aspartame may be transported by means of a helical auger to a point, below which, the chewing gum sheet is being formed. The aspartame is then allowed to fall by gravity onto the sheet and thereby coat the sheet. Any aspartame remaining, may then be applied, during a subsequent operation(s) such as rolling, sizing or wrapping.

Those skilled in the art will understand that the aspartame surface coating will not necessarily be uniform over the surface of the finished chewing gum piece. This is due mainly to the rolling and flattening action of the machinery on the product. A uniform aspartame surface coating is not necessary to accomplish the advantages of the invention and is not therefore intended to be a requirement thereof.

The sweetness stability of an aspartame sweetened chewing gum prepared as described in the Example was compared to the sweetness stability of an aspartame sweetened chewing gum of the same percentage composition (aspartame increased due to known instability) but having the aspartame incorporated into the chewing gum mix (control). The test samples were wrapped, stored at room temperature and assayed for aspartame content after the noted time period had elapsed.

| SAMPLE | Percentage Aspartame Initial | Percentage Aspartame Final | Aspartame Percentage Decrease |
|---|---|---|---|
| Aspartame Surface Coat | .014 | .017 (5½ mos.) | 0 |
| Control | .146 | .053 (5 mos.) | 64 |

The data clearly demonstrates that the aspartame sweetened chewing gum of the invention has enhanced sweetness stability when compared to an aspartame sweetened chewing gum which contains aspartame in the chewing gum mix.

We claim:

1. A method for improving the sweetness stability of an aspartame sweetened chewing gum composition which comprises applying onto the surface of the chewing gum piece a dusting of a material comprising aspartame.

2. An aspartame sweetened chewing gum composition having improved sweetness stability, which comprises a chewing gum piece having applied onto its surface a dusting of a material comprising aspartame.

3. The method of claim 1 wherein the aspartame is applied in an amount up to 0.25% by weight, based on the weight of the composition.

4. The composition of claim 2 wherein the aspartame is applied in an amount up to 0.25% by weight, based on the weight of the composition.

5. The method of claim 1 wherein the aspartame is applied in an amount up to 0.058% by weight, based on the weight of the composition.

6. The composition of claim 2 wherein the aspartame is applied in an amount up to 0.058% by weight, based on the weight of the composition.

* * * * *